(12) United States Patent
Higuerey et al.

(10) Patent No.: US 6,310,312 B1
(45) Date of Patent: Oct. 30, 2001

(54) METHOD AND APPARATUS FOR TESTING ELECTRODES IN AN EDM PROCESS

(75) Inventors: Evelitsa Higuerey, Middletown; Gordon Reed, Plantsville; Thomas R. Davis, Durham; Wilfred Grenfell, East Haven, all of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/471,581

(22) Filed: Dec. 23, 1999

Related U.S. Application Data

(60) Provisional application No. 60/142,242, filed on Jul. 2, 1999.

(51) Int. Cl.$^7$ ............................................... B23H 1/00
(52) U.S. Cl. .............................. 219/69.11; 219/69.17
(58) Field of Search ........................... 219/69.11, 69.15, 219/69.17

(56) References Cited

U.S. PATENT DOCUMENTS

| | | | |
|---|---|---|---|
| 3,875,667 | 4/1975 | Wilke | 33/174 |
| 4,159,407 | 6/1979 | Wilkinson et al. | 219/69 M |
| 4,191,878 | * 3/1980 | Check et al. | |
| 4,197,443 | 4/1980 | Sidenstick | 219/69 E |
| 4,345,131 | 8/1982 | Semon et al. | 219/618 |
| 4,562,391 | * 12/1985 | Inone | |
| 4,628,171 | 12/1986 | Colby | 219/69 G |
| 4,696,190 | 9/1987 | Bucher et al. | 73/865.8 |
| 4,771,157 | * 9/1988 | Sato et al. | |
| 4,798,929 | 1/1989 | Itoh | 219/69 W |
| 4,814,573 | 3/1989 | Check et al. | 219/69 |
| 4,919,586 | 4/1990 | Derby | 414/735 |
| 4,922,076 | 5/1990 | Cross et al. | 219/69.15 |
| 4,962,356 | 10/1990 | Eberlein et al. | 324/158 |
| 5,051,912 | 9/1991 | Johanson et al. | 364/747.04 |
| 5,061,895 | 10/1991 | Fong | 324/158 R |
| 5,224,048 | * 6/1993 | Ohba et al. | |
| 5,235,740 | 8/1993 | Kroeker et al. | 29/741 |
| 5,247,151 | 9/1993 | Hagerman | 219/69.17 |
| 5,360,957 | * 11/1994 | Haefner et al. | |
| 5,369,239 | * 11/1994 | Itoh | |
| 5,426,369 | 6/1995 | Brinker | 324/400 |
| 5,571,426 | * 11/1996 | Akemura | |
| 6,040,695 | * 3/2000 | Raulerson et al. | |
| 6,150,627 | * 11/2000 | Sugiyama | |
| 6,208,150 | * 3/2001 | Akamatsu | |

\* cited by examiner

Primary Examiner—Blaine Copenheaver
Assistant Examiner—Colleen Cooke
(74) Attorney, Agent, or Firm—Brian J. Hamilla; Ronald G. Cummings

(57) ABSTRACT

An automated method and apparatus for electrode discharge machining wherein method includes moving the tool holder to the electrode loader, automatically mounting an electrode into the tool holder and then testing the electrode for conformance to geometric and dimension tolerances and testing the electrode for proper alignment in the tool holder and thus proper alignment relative to the workpiece just prior to moving the tool holder to the workpiece area for machining. The apparatus includes a moveable servomechanism with a tool holder, an electrode magazine, and a sensor module for testing an electrode mounted in the tool holder. The sensor module has a recess configuration of conductive material complimentary to the electrode such that the electrode will make contact with the conductive material when inserted into the sensor module if the electrode is out of tolerance or misaligned in the tool holder.

19 Claims, 4 Drawing Sheets

FIG. 2
FIG. 2A
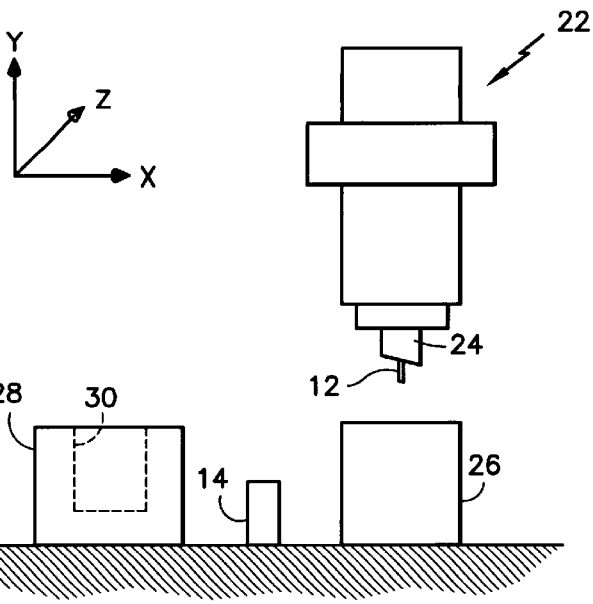
FIG. 2B
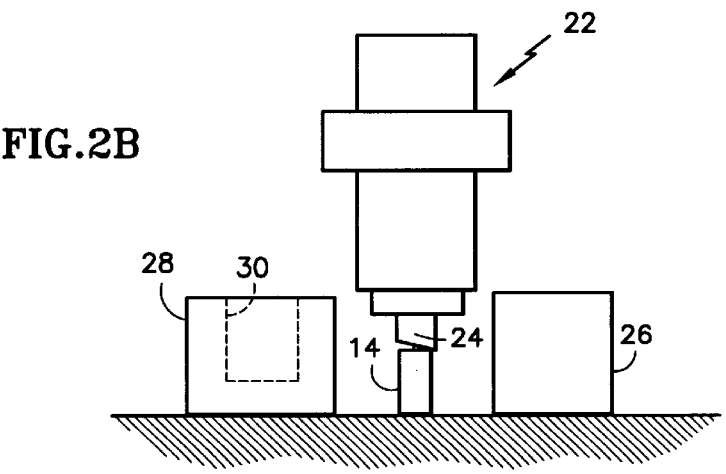
FIG. 2C
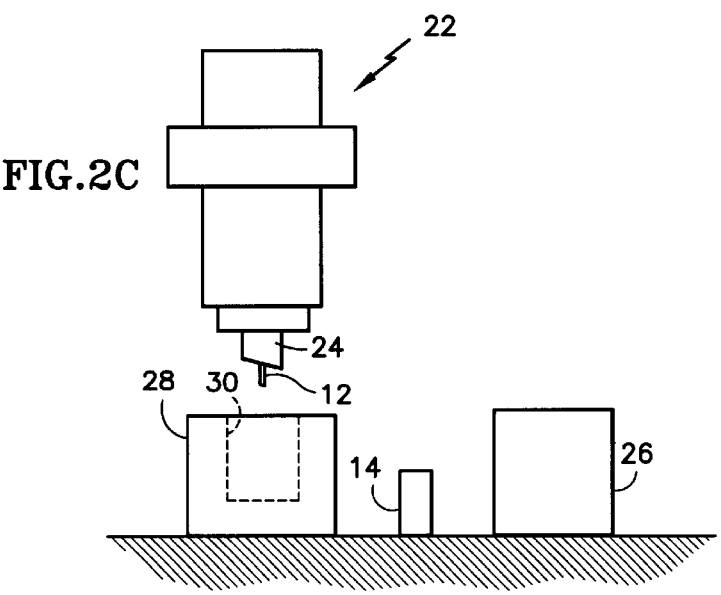

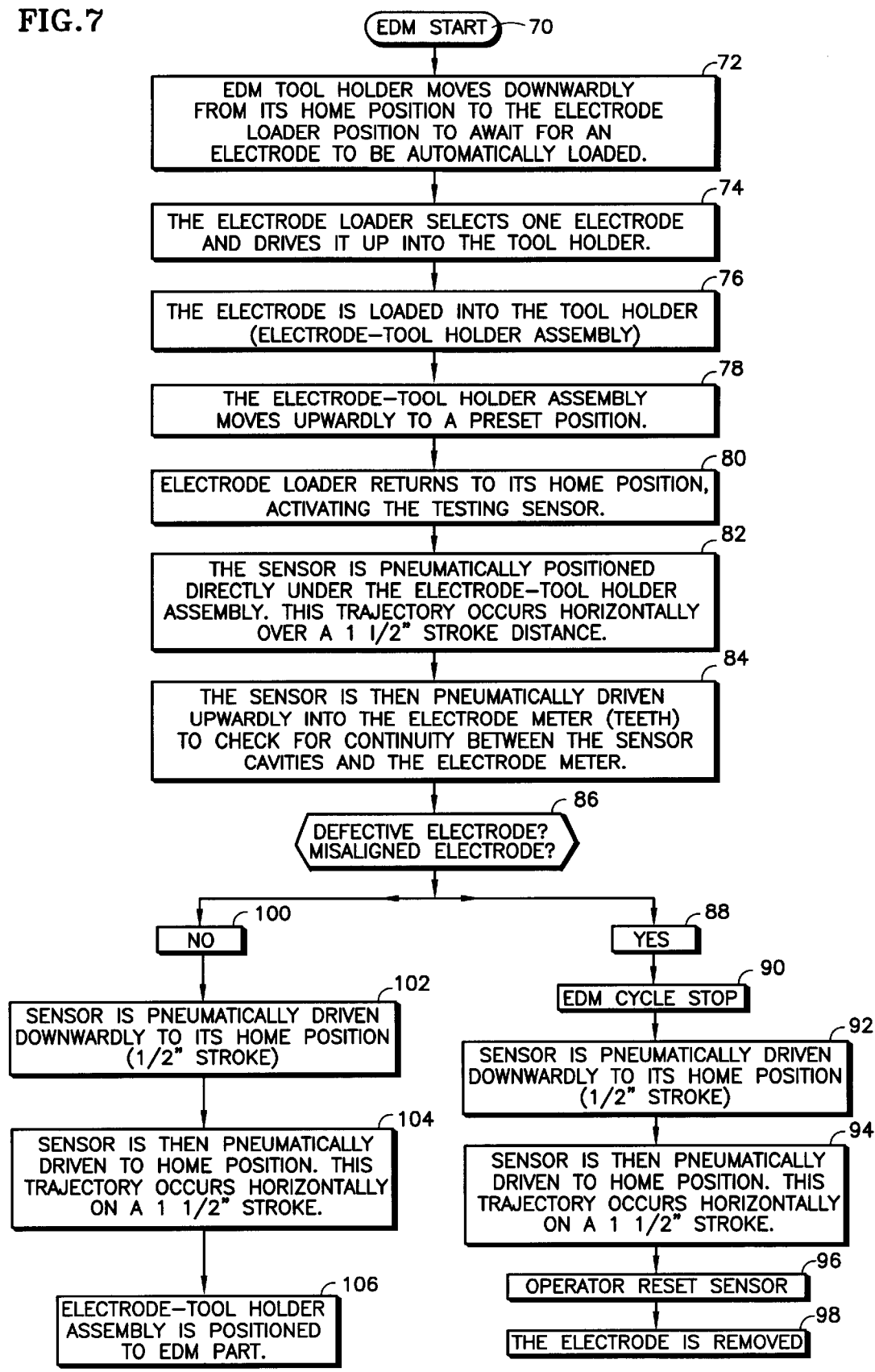

METHOD AND APPARATUS FOR TESTING ELECTRODES IN AN EDM PROCESS

This application claims the benefit of U.S. Provisional Application No. 60/142,242, filed on Jul. 2, 1999.

TECHNICAL FIELD

This invention relates to electrical discharge machining ("EDM") and more particularly to a method and apparatus for testing electrodes in an EDM process that have particular utility in the manufacture of airfoils for gas turbine engines.

BACKGROUND OF THE INVENTION

Electrical discharge machining is used in the manufacture of various metallic components, including for example, gas turbine engine components such as turbine airfoils. EDM uses high energy electrical discharges (i.e., sparks) between an electrode and an electrically conductive workpiece to remove material from the workpiece. The electrode is advanced to the workpiece so as to be separated by only a small distance or gap. A dielectric fluid medium fills the gap and a differential voltage of specified magnitude is applied between the electrode and the workpiece causing the dielectric medium to ionize and break down. Current then starts to flow between the electrode and the workpiece and through the dielectric medium. The current causes heat to be generated at the surface of the workpiece resulting in a significant temperature rise and localized melting of the workpiece material. The magnitude of the differential voltage is reduced, the dielectric medium de-ionizes and the current terminates. Heat generation ceases thereby allowing the electrode and the workpiece to cool somewhat. The molten material solidifies as it is flushed from the work area by the dielectric medium, leaving a crater in the workpiece. The crater typically has a shape complementary to that of the electrode. This process, or cycle, commonly referred to as an "on/off" cycle is repeated in a pulsating manner until the desired machining of the workpiece is complete.

EDM is particularly useful for precision drilling and is used to drill arrays of diffused cooling holes in airfoils for gas turbine engines as disclosed for example in Sidenstick, U.S. Pat. No. 4,197,443 issued Apr. 8, 1980 and entitled Method And Apparatus For Forming Diffused Cooling Holes In An Air Foil. In gas turbine engines, it is common practice to cool the surface of airfoils such as turbine airfoils by passing high pressure air through channels in the airfoil and out through holes in the wall of the airfoil thereby providing a layer or a film of cooling gas over the airfoil surface. It has been found that film cooling effectiveness can be obtained with reduced amounts of cooling air by the use of diffusion film holes which have enlarged openings. Such film holes must be precisely formed and positioned in the airfoil.

The precision drilling of such air holes is achieved with a multi-tooth electrode such as that disclosed in Cross et al., U.S. Pat. No. 4,922,076 issued May 1, 1990 entitled Electro-Discharge Machining Electrode. Such electrodes are formed from thin copper ribbon or other malleable conductive material and have an array of teeth for forming a corresponding array of air holes in the airfoil. The electrodes are subject to burrs, slivers and bending in the manufacturing process. Further, the teeth are quite thin and consequently subject to bending or deformation from handling. For example, the teeth in the electrode disclosed in Cross et al., have a leading section which is typically only 0.005"–0.030" in diameter.

In order to achieve the necessary precision drilling, the electrode must be within specified configuration and dimension tolerances. In addition, the electrode must be properly aligned relative to the airfoil. If the electrode is out of tolerance or improperly aligned relative to the airfoil, the airfoil will be unacceptable for use and scrapped which results in increased manufacturing costs.

EDM machines are commercially available that provide automated drilling of airfoils. It would be desirable to have integrated electrode testing for configuration and dimension tolerances and for alignment in an automated drilling process. It would also be desirable to have a testing apparatus that can be retrofitted to existing EDM machines.

DISCLOSURE OF THE INVENTION

It is an object of the present invention to provide a new and improved apparatus and method for testing electrodes for configuration and dimension tolerance.

A further object of the invention is to provide such an apparatus and method for also testing the alignment of an electrode in a tool holder just prior to machining a workpiece.

A further object of the invention is to provide such an apparatus which can be integrated in an EDM machine.

A further object of the invention is to provide such an apparatus which can be retrofitted to existing EDM machines.

Other objects will be in part obvious and impart pointed out more in detail hereinafter.

It has been found that the foregoing and related objects are attained in an automated electrode discharge machining method wherein the tool holder is first moved to an electrode loader for mounting an electrode. The tool holder is moved away from the electrode loader and the electrode is then tested for conformance to predetermined tolerances. The tool holder is then moved to the workpiece area and the machining of the workpiece is initiated. In a preferred embodiment of the method, the electrode mounted in the tool holder is tested for proper alignment in the tool holder simultaneously with testing for conformance to predetermined tolerances. The electrode discharge machine apparatus of the present invention includes a servomechanism having a tool holder for mounting the electrode and an electrode loader for loading an electrode into the tool holder. The servomechanism is moveable from the electrode loader to a workpiece area for supporting a workpiece to be machined. A sensor module tests the electrode mounted in the tool holder for conformance to predetermined tolerances. In one embodiment of the present invention, the sensor module has a recess configuration of conductive material complimentary to the shape of the electrode such that contact of the electrode with the conductive material when the electrode is inserted into the recessed configuration indicates that the electrode is out of tolerance or misaligned in the tool holder. In operations where the electrode has an array of teeth, the recess configuration of the sensor has a plurality of recesses complimentary to the array of teeth on the electrode.

BRIEF DESCRIPTION OF THE DRAWINGS

FIG. 2 is a diagram illustrating steps of an alternate embodiment of a method for testing electrodes.

FIG. 3 is a schematic diagram of an apparatus for testing electrodes in accordance with the present invention.

FIG. 4 is an exploded perspective view of the sensor module of FIG. 1.

FIG. 7 is a flowchart of the testing process of the apparatus of FIG. 5.

BEST MODE FOR CARRYING OUT THE INVENTION

Figure 1:
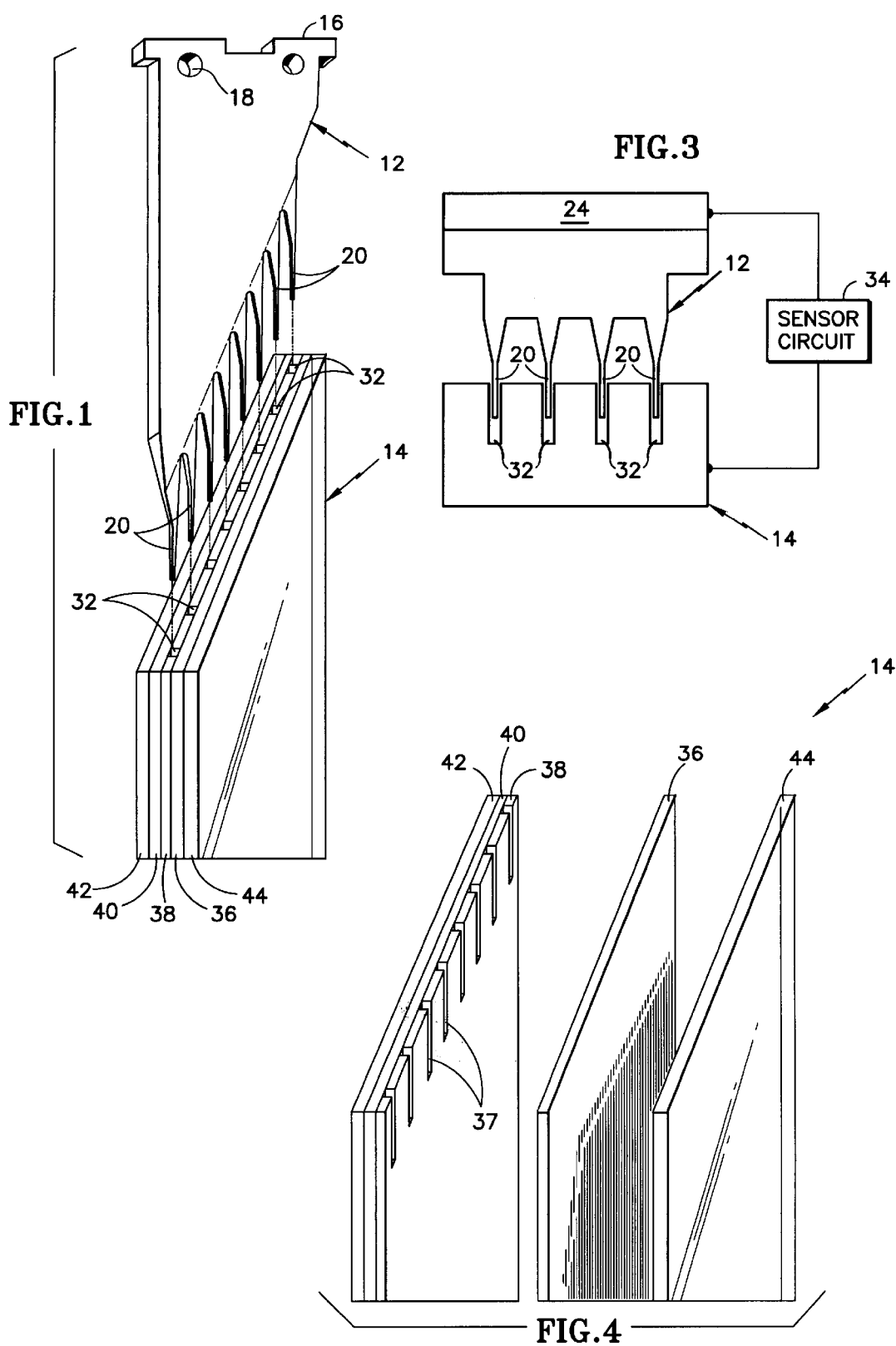
FIG. 1 is an exploded perspective view of an electrode and corresponding sensor module in accordance with the present invention.

Although specific forms of the present invention have been selected for illustration in the drawings and the following description is drawn in specific terms for the purpose of describing these forms of the invention, the description is not intended to limit the scope of the invention which is defined in the appending claims.

Referring to the drawing wherein identical numerals may be utilized to identify like or similar parts in the various embodiments shown herein, an electrode 12 and corresponding sensor or test module 14 are shown in FIG. 1. The electrode 12 is a conventional electrode for drilling cooling holes in an airfoil. The electrode 12 has a base 16 with aperture 18 for mounting in a tool holder of an EDM machine and array of teeth 20 corresponding to the desired array of cooling holes to be machined in an airfoil. The electrode is formed from thin malleable conductive material such as copper and the teeth 20 are susceptible to bending or deformity from initial manufacture or as a result of handling. Electrodes of this type have also experienced the occurrence of slivers as a result of the manufacturing process which would result in an unacceptable machining of the airfoil.

Referring to FIG. 2, selected sequential steps of an EDM machining process (with integrated monitoring or testing of the electrode) are shown in FIGS. 2A–2C. For purposes of illustrating such sequential steps, selected components of an EDM machine are utilized. Such selected components comprise a servomechanism 22 with a tool holder 24 for mounting an electrode 12, an electrode loader or a magazine of electrodes 26, a sensor module 14, and an EDM tank 28 having a fixture (not shown) for securing the workpiece in a bath of dielectric media 30. In a typical EDM machine, the servomechanism 22 is under microprocessor control or the like for precise movement and positioning in the X,Y and Z directions. In the position of FIG. 2A, the servomechanism 22 is directly above the electrode magazine 26 and is then lowered to the magazine for automated loading of an electrode 12 into the tool holder 24. Once loaded, the servomechanism 22 is raised in the Y direction and moved in the X direction such that the electrode is directly above the sensor module 14.

Referring to FIG. 2B, the servomechanism has been moved down in the Y direction so that the teeth (not shown) are received within the sensor module 14 for testing. As will be explained in more detail hereinafter, the sensor module senses or tests the electrode for configuration and dimensions, i.e., to determine if the electrode is within the specified tolerances. Simultaneously, the sensor module is checking the electrode for proper alignment in the tool holder of the servomechanism which also establishes whether the electrode will be in proper alignment with the workpiece during the machining process. If the electrode is out of tolerance or misaligned in the tool holder (i.e., a positive test), the machining process is halted before the servomechanism reaches the machining position of FIG. 2C and the electrode is removed. If a negative test is indicated, the servomechanism is raised in the Y direction and moved in the X direction over the fixture and workpiece to the position of FIG. 2C. The servomechanism is then lowered in the Y direction with the electrode positioned relative to the workpiece and a differential voltage is applied across the electrode and workpiece to begin the drilling step. As can be seen, the testing of the electrode is an integrated step in the automated machining process and the electrode is tested for configuration and dimensions and for alignment just prior to the steps of machining the workpiece.

The sensing apparatus for checking the electrode is schematically depicted in FIG. 3. The electrode and sensor module are in a testing position corresponding to that of FIG. 2B. The sensor module 14 is formed of conductive material and has a plurality of recesses or cavities 32 (only four of which are shown for purposes of explanation) to receive the array of teeth. The cavities 32 are spaced and sized relative to the electrode teeth so as to provide clearance (i.e., no contact between the teeth 20 and the sensor module 14) unless the electrode is geometrically or dimensionally out of tolerance. (An example of an electrode being geometrically out of tolerance would be the presence of an unacceptable sliver, burr or other additional material on the electrode.) A sensor circuit 34 is electrically connected to the sensor module and to the electrode through the tool holder. The sensor circuit generates a signal upon contact between the electrode and the sensor module. Contact between the electrode and the sensor module indicates that the electrode is geometrically or dimensionally out of tolerance. Non-contact between the electrode and the sensor module indicates that the electrode is within the specified tolerance. Therefore, the sensor circuit may be configured to sense either contact or non-contact for purposes of the testing operation.

The recesses of the sensor module are complimentary (i.e., contoured) to the shape of the electrode and therefore electrodes utilized in other machining processes would require sensor modules with complementary recesses. While the sensor module is depicted as being formed of conductive material, the sensor module may be nonconductive material with the recesses being lined with conductive material and electrically connected to the sensor circuit. Additionally, while the sensor module of the illustrated embodiment utilizes electrical contact to sense out-of-tolerance, a sensor module may utilize alternative optical, magnetic or other electrical techniques for sensing an out-of-tolerance condition.

The sensor module is positioned relative to the tool holder and the workpiece such that the sensor module is simultaneously checking the electrode for proper alignment with the tool holder. If the sensor circuit indicates that the electrode is not in contact with the sensor module, then the electrode is in proper alignment with the tool holder and the electrode will be properly positioned during the drilling operation. Accordingly, the sensor apparatus is simultaneously testing for electrode configuration per se and for ultimate alignment of the electrode with the workpiece.

Referring to FIGS. 1 and 4, the sensor module 14 is shown in more detail. The electrode 12 has an array of eight teeth 20 and correspondingly the sensor module has eight cavities 32 for receiving the teeth 20. In the illustrated embodiment, the cavities are rectangular slots formed in a central layer of the sensor module. Generally, the tolerance of the electrode is increased by a factor of two in determining the sensor clearance to account for other factors in the process. For example, if the electrode has a 0.020" tolerance, the sensor tolerance would be 0.040". In testing the electrode 12, high accuracy has been achieved by inserting the teeth 50% into the sensor module.

The sensor module 14 has a layered construction with three inner layers 36, 38, 40 of conductive material sandwiched between opposed outer layers 42, 44 of non-conductive material. Slots 37 are machined or otherwise formed in the center layer 36 which is sandwiched between opposed conductive layers 36, 40. The slots 37 as bounded by the adjoining layers 36, 40 form the cavities 32 for receiving the teeth 20. The layers 36, 38, 40, 42, 44 are then bonded together to form an integral sensor module. In the illustrated embodiment, the material of the non-conductive layers 42, 44 is Plexiglas and the conductive layers are formed of metal (steel) shim stock (which is 0.040" thick). The multi-layered construction provides the required tolerances with cost effective fabrication.

Figure 5:
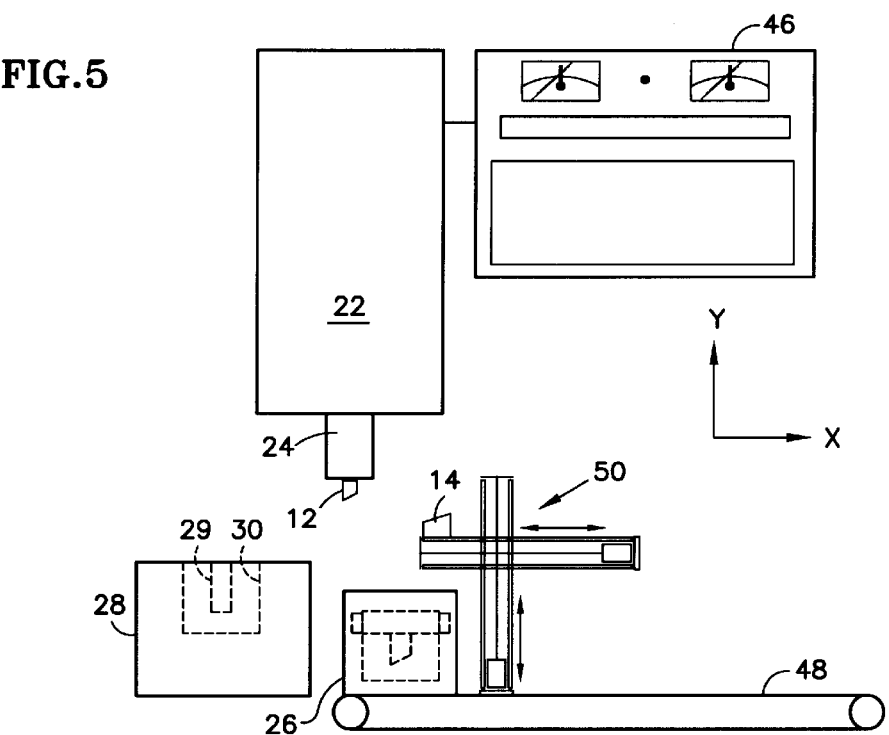
FIG. 5 is a schematic diagram of an EDM machine with an integrated apparatus for testing electrodes in accordance with the present invention.

Referring to FIG. 5, a schematic diagram of a preferred embodiment of an EDM system incorporating the sensing apparatus of the present invention is shown. The EDM system generally comprises a servomechanism 22 with a tool holder 24, a controller 46 for controlling the EDM process, an electrode magazine 26 which stores a plurality of electrodes 12, a table 48, and a tank 28 with a fixture 29 for securing the workpiece in a dielectric medium. In a conventional EDM machining process, the servomechanism is positioned over the electrode magazine and the tool holder is extended to position the tool holder for automatic loading of an electrode into the tool holder. After the electrode is secured in the tool holder, the servomechanism is retracted and moved in the X direction to position the electrode above the workpiece and the tool holder is extended to position the electrode near the workpiece to begin the drilling process. After the drilling has been completed, the tool holder is retracted in the Y direction, the servomechanism is moved to discard the electrode and the servomechanism is positioned over the electrode magazine to begin the process again. The movement of the servomechanism and the control of the application of the differential voltage to the electrode and workpiece is under the control of the controller 46. The EDM apparatus as just described is conventional and need not be described in further detail for purposes of the present invention. This apparatus is commercially available under the trade name BRETCO, Model Number SH-204-W/BP30, manufactured by Raycon of Ann Arbor, Mich.

The sensor apparatus generally comprises the sensor module 14, a module mounting assembly 50 for positioning the sensor module and a sensor circuit 34 (not shown in FIG. 5) connected to the electrode and sensor module. The sensor module is mounted to the mounting assembly for movement of the sensor module into and out of a test position with the electrode. The test sequence of the apparatus of FIG. 5 differs principally from the test sequence of FIG. 2 in that the sensor module is transported by the module mounting assembly 50 to the electrode for testing of the electrode whereas in FIG. 2 the servomechanism delivers the electrode to the sensor module for testing purposes.

In FIG. 5, the EDM process begins with the servomechanism being moved into position over the electrode magazine and the tool holder is extended in the Y direction for automatic loading of an electrode into the tool holder. The tool holder and electrode are retracted in the Y direction and the servomechanism remains stationary during the testing of the electrode. The module mounting assembly is first moved horizontally in the X direction to position it directly below the electrode and then it is raised in the Y direction until the teeth of the electrode are received within the sensor module to simultaneously test for electrode configuration and for electrode alignment relative to the tool holder. If there is contact between the sensor module and the electrode indicating the electrode is out of tolerance or misaligned in the tool holder, the EDM cycle is halted and the sensor module is retracted from the electrode in the Y direction and then moved horizontally in the X direction to the position of FIG. 5. The electrode is removed from the tool holder and discarded and the sequence is then initiated again from the beginning. If no contact is indicated, the sensor module is again retracted from the electrode in the Y direction and then moved horizontally in the X direction to the position of FIG. 5. The servomechanism is then moved directly over the workpiece and the tool holder is extended to position the electrode near the workpiece to begin the drilling operation. As can be appreciated, the testing of the electrode is an integrated automated step in the EDM process which is quickly accomplished relative to the overall automated process.

Figure 6:
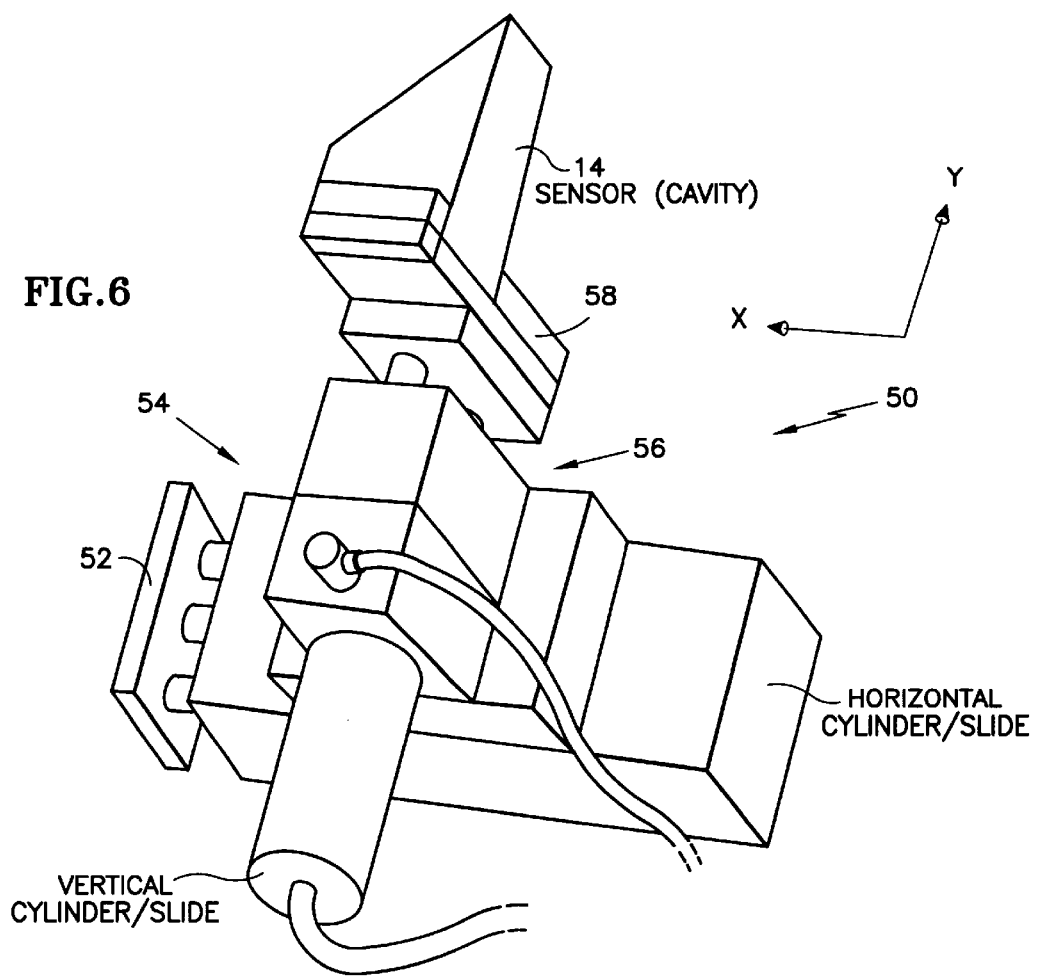
FIG. 6 is a perspective view of the sensor module and mounting assembly depicted in FIG. 5.

A preferred embodiment of the module mounting assembly 50 is shown in FIG. 6. The mounting assembly generally comprises a base 52 for mounting to a vertical support (not shown) of the table 48, a first pneumatically actuated slide assembly 54 for moving the sensor module in the X direction to the required predetermined positions, a second pneumatically actuated slide assembly 56 for moving the sensor module in the Y direction to the required predetermined positions and a bracket 58 for mounting the sensor module to the slide assembly 56. Pneumatic slide assemblies provide smooth movement which avoids damage to the electrode and false out-of-tolerance indications.

The flowchart of FIG. 7 sets forth the principal sequential steps in a cycle of one embodiment of EDM machine from the initial startup to the positioning of the electrode adjacent the workpiece to be machined. In the sequence of FIG. 7, the EDM process is initiated at step 70 and at step 72 the tool holder moves downwardly from the home position to the electrode loader position. At step 74 the electrode loader selects one electrode and drives it into the tool holder so it is loaded into the tool holder at 76. At step 78, the tool holder assembly moves upwardly to a preset position. At step 80, the electrode loader returns to its home position and the sensor system is activated for testing the electrode. The sensor is pneumatically positioned at step 82 directly under the electrode tool holder. At step 84, the sensor is then pneumatically driven upward to receive the electrode teeth to check for continuity between the sensor cavities and the electrode meter. At step 86 it is determined whether any of the teeth are in contact with the sensor cavities. If it is determined at step 86 that the electrode is out-of-tolerance (i.e., geometrically or dimensionally out of tolerance) or misaligned, the EDM cycle is halted at step 90. The sensor is pneumatically driven downwardly at step 92 and withdrawn horizontally from beneath the tool holder at step 94 to its home position. At step 96, the operator resets the sensor and the electrode is removed at step 98. If it is determined at step 100 that the electrode teeth are not in contact with the sensor cavities, the sensor is pneumatically driven downwardly at step 102 and then horizontally to its home position at step 104. At step 106, the electrode is then positioned relative to the workpiece to machine the workpiece.

As can be appreciated from the foregoing, a new and improved method and apparatus has been provided for testing electrodes for configuration and dimension tolerance and for simultaneously testing alignment. Furthermore, the testing apparatus may be integrated as part of an automated machining process with existing EDM machines.

As will be apparent to persons skilled in the art, various modifications and adaptations of the structure above described will become readily apparent without departure from the spirit and scope of the invention.

What is claimed is:

1. An electrode discharge machining (EDM) machining method with an EDM apparatus of the type having a tool holder for mounting an electrode, an electrode loader with a supply of electrodes, a sensor module, and a workpiece mounting area for mounting the workpiece to be machined, the method comprising the steps of:

moving the tool holder to the electrode loader;

mounting an electrode having at least one tooth into the tool holder;

moving the tool holder away from the electrode loader;

inserting the electrode mounted in the tool holder into the sensor module to test the electrode for conformance to predetermined tolerances;

moving the tool holder to the workpiece area; and machining the workpiece.

2. The method of claim 1 comprising testing the electrode mounted in the tool holder for proper alignment of the electrode in the tool holder.

3. The method of claim 1 wherein the step of testing the electrode for conformance to predetermined tolerances comprises simultaneously testing the electrode for proper alignment in the tool holder.

4. The method of claim 1 wherein the step of testing the electrode for conformance to predetermined tolerances comprises:

providing a sensor module having a recess configuration of conductive material complementary to the electrode such that contact of the electrode with the conductive material when the electrode is inserted into the recess configuration of the sensor modules indicates that the electrode is out-of-tolerance or misaligned in the tool holder;

inserting the electrode into the sensor module; and determining if the electrode is in contact with the conductive material of the recess.

5. The method of claim 1 wherein the EDM apparatus is of the type having a sensor module for testing the electrode for conformance to predetermined tolerances, wherein the step of testing the electrode comprises:

positioning the electrode and sensor module in a testing position after the step of moving the tool holder away from the electrode loader; and testing the electrode for conformance to tolerances.

6. The method of claim 5 wherein the step of positioning the electrode and sensor module in a testing position comprises moving the sensor module into a testing position relative to the electrode.

7. The method of claim 5 wherein the step of positioning the electrode and sensor module in a testing position comprises moving the electrode into a testing position relative to the sensor module.

8. The method of claim 1 wherein the EDM apparatus is of the type having a sensor module with a recess configuration of conductive material complementary to the electrode such that contact of the electrode with the conductive material when the electrode is inserted into the sensor module recess configuration indicates that the electrode is out-of-tolerance or misaligned in the tool holder, wherein the step of testing the electrode comprises:

positioning relatively the electrode and sensor module such that the electrode is disposed in the recess configuration of the sensor module; and determining whether the electrode is in contact with the conductive material.

9. The method of claim 8 wherein the step of positioning the electrode and sensor module comprises moving the sensor module to the electrode so that the electrode is disposed in the recess configuration of the sensor module.

10. The method of claim 8 wherein the step of positioning the electrode and sensor module comprises moving the electrode to the sensor module so that the electrode is disposed in the recess configuration of the sensor module.

11. An electrode discharge machine apparatus comprising:

a servomechanism having a tool holder for mounting an electrode;

an electrode loader for mounting an electrode in the tool holder;

a workpiece area for supporting a workpiece to be machined;

said servomechanism being movable from said electrode loader to said workpiece area; and a sensor for receiving therein an electrode mounted in the tool holder to test the electrode for conformance to predetermined tolerances.

12. The device of claim 11 wherein the sensor comprises a sensor module with a recess configuration of conductive material complementary to an electrode such that contact of the electrode with the conductive material when the electrode is inserted into the sensor module recess configuration indicates that the electrode is out-of-tolerance or misaligned in the tool holder.

13. The device of claim 12 wherein the recess configuration of the sensor comprises a plurality of recesses complementary to a plurality of teeth on said electrode.

14. An electrode discharge machining (EDM) machining method with an EDM apparatus of the type having a tool holder for mounting an electrode, an electrode loader with a supply of electrodes, and a workpiece mounting area for mounting the workpiece to be machined, the method comprising the steps of:

moving the tool holder to the electrode loader;

mounting an electrode having at least one tooth into the tool holder;

moving the tool holder away from the electrode loader;

providing a sensor module having a recess configuration of conductive material complementary to the electrode such that contact of the electrode with the conductive material when the electrode is inserted into the recess configuration of the sensor modules indicates that the electrode is out-of-tolerance or misaligned in the tool holder;

inserting the electrode into the sensor module;

determining if the electrode is in contact with the conductive material of the recess;

moving the tool holder to the workpiece area; and machining the workpiece.

15. An electrode discharge machining (EDM) machining method with an EDM apparatus of the type having a tool holder for mounting an electrode, an electrode loader with a supply of electrodes, a sensor module with a recess configuration of conductive material complementary to the electrode such that contact of the electrode with the conductive material when the electrode is inserted into the sensor module recess configuration indicates that the electrode is out-of-tolerance or misaligned in the tool holder, and a workpiece mounting area for mounting the workpiece to be machined, the method comprising the steps of:

moving the tool holder to the electrode loader;

mounting an electrode having at least one tooth into the tool holder;

moving the tool holder away from the electrode loader;

positioning relatively the electrode and sensor module such that the electrode is disposed in the recess configuration of the sensor module;

determining whether the electrode is in contact with the conductive material;

moving the tool holder to the workpiece area; and machining the workpiece.

16. The method of claim 15 wherein the step of positioning the electrode and sensor module comprises moving the sensor module to the electrode so that the electrode is disposed in the recess configuration of the sensor module.

17. The method of claim 15 wherein the step of positioning the electrode and sensor module comprises moving the electrode to the sensor module so that the electrode is disposed in the recess configuration of the sensor module.

18. An electrode discharge machine apparatus comprising:

a servomechanism having a tool holder for mounting an electrode;

an electrode loader for mounting, an electrode in the tool holder;

a workpiece area for supporting a workpiece to be machined;

said servomechanism being movable from said electrode loader to said workpiece area; and a sensor for testing an electrode mounted in the tool holder for conformance to predetermined tolerances, said sensor including a sensor module with a recess configuration of conductive material complementary to an electrode such that contact of the electrode with the conductive material when the electrode is inserted into the sensor module recess configuration indicates that the electrode is out-of-tolerance or misaligned in the tool holder.

19. The device of claim 18 wherein the recess configuration of the sensor comprises a plurality of recesses complementary to a plurality of teeth on said electrode.

\* \* \* \* \*